US008755672B2

(12) United States Patent
Kim et al.

(10) Patent No.: US 8,755,672 B2
(45) Date of Patent: Jun. 17, 2014

(54) MEDIA FILE FORMAT BASED ON, METHOD AND APPARATUS FOR REPRODUCING THE SAME, AND APPARATUS FOR GENERATING THE SAME

(75) Inventors: Tae Hyeon Kim, Seoul (KR); Hyouk Jean Cha, Seoul (KR); Ji Soo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 624 days.

(21) Appl. No.: 12/666,710

(22) PCT Filed: Jun. 26, 2008

(86) PCT No.: PCT/KR2008/003708
§ 371 (c)(1),
(2), (4) Date: Mar. 23, 2010

(87) PCT Pub. No.: WO2009/002115
PCT Pub. Date: Dec. 31, 2008

(65) Prior Publication Data
US 2011/0002594 A1 Jan. 6, 2011

Related U.S. Application Data

(60) Provisional application No. 60/929,417, filed on Jun. 26, 2007.

(51) Int. Cl.
*H04N 9/80* (2006.01)
(52) U.S. Cl.
USPC .......................................................... 386/248
(58) Field of Classification Search
None
See application file for complete search history.

(56) References Cited

U.S. PATENT DOCUMENTS

| 4,736,246 | A | * | 4/1988 | Nishikawa | 348/56 |
|---|---|---|---|---|---|
| 5,604,824 | A | * | 2/1997 | Chui et al. | 382/248 |
| 5,617,334 | A | * | 4/1997 | Tseng et al. | 708/203 |
| 7,472,007 | B2 | * | 12/2008 | Kong et al. | 701/45 |
| 2003/0035001 | A1 | * | 2/2003 | Van Geest et al. | 345/753 |
| 2003/0095177 | A1 | | 5/2003 | Yun et al. | |
| 2005/0259147 | A1 | * | 11/2005 | Nam et al. | 348/43 |
| 2006/0050381 | A1 | * | 3/2006 | Konstantinidis | 359/462 |
| 2006/0129909 | A1 | * | 6/2006 | Butt et al. | 715/500.1 |
| 2006/0192776 | A1 | * | 8/2006 | Nomura et al. | 345/419 |
| 2007/0101267 | A1 | * | 5/2007 | Hua et al. | 715/721 |

FOREIGN PATENT DOCUMENTS

KR   10-2007-0006282 A   1/2007

* cited by examiner

*Primary Examiner* — Sath V Perungavoor
*Assistant Examiner* — Kate Luo
(74) *Attorney, Agent, or Firm* — Birch, Stewart, Kolasch & Birch, LLP

(57) ABSTRACT

A media file format based on an ISO base media file, a method and apparatus for reproducing the same, and an apparatus for generating the same are disclosed. The media file format based on an ISO base media file includes: a first area including first information indicating whether or not a file includes stereoscopic contents; and a second area including second information related to a reproducing method or a storing method of a stream included in the stereoscopic contents. Accordingly, the media file format based on an ISO base media file can effectively store and reproduce stereoscopic contents.

12 Claims, 6 Drawing Sheets

Figure 5

```
<xs:element name="DepthMap">
    <xs:complexType>
        <xs:sequence>
            <xs:element maxOccurs="unbounded" ref="DepthMapTrack"/>
        </xs:sequence>
    </xs:complexType>
</xs:element>

<xs:element name="DepthMapTrack">
    <xs:complexType>
        <xs:sequence>
            <xs:element maxOccurs="unbounded" ref="DepthMapFrame"/>
        </xs:sequence>
        <xs:attribute name="ID" use="required" type="xs:integer"/>
        <xs:attribute name="VideoTrackID" use="required" type="xs:integer"/>
    </xs:complexType>
</xs:element>

<xs:element name="DepthMapFrame">
    <xs:complexType>
        <xs:attribute name="BitNum" use="required" type="xs:integer"/>
        <xs:attribute name="Offset" use="required" type="xs:integer"/>
        <xs:attribute name="QuantLevel" use="required" type="xs:integer"/>
        <xs:attribute name="StartTime" use="required" type="xs:integer"/>
        <xs:attribute name="EndTime" use="required" type="xs:integer"/>
    </xs:complexType>
</xs:element>
```

```
<DepthMap>
    <DepthMapTrack ID="1" VideoTrackID="0">
        <DepthMapFrame BitNum="7" Offset="-128" QuantLevel="2" StartTime="0" EndTime="960"/>
        <DepthMapFrame BitNum="2" Offset="0" QuantLevel="3" StartTime="960" EndTime="1800"/>
        <DepthMapFrame BitNum="6" Offset="-103" QuantLevel="1" StartTime="1800" EndTime="3620"/>
                              .
                              .
                              .
    </DepthMapTrack>
</DepthMap>
```

MEDIA FILE FORMAT BASED ON, METHOD AND APPARATUS FOR REPRODUCING THE SAME, AND APPARATUS FOR GENERATING THE SAME

This application is the National Phase of PCT/KR2008/003708 filed on Jun. 26, 2008, which claims priority under 35 U.S.C. 119(e) to U.S. Provisional Application No. 60/929,417 filed on Jun. 26, 2007, all of which are hereby incorporated by reference into the present application.

TECHNICAL FIELD

The present invention relates to a media file format based on an ISO base media file, a method and apparatus for reproducing the same, and an apparatus for generating the same, and more particularly, to a media file format based on an ISO base media file, a method and apparatus for reproducing the same, and an apparatus for generating the same to effectively store and reproduce stereoscopic contents.

BACKGROUND ART

Recently, the rapid advancement of the stereoscopic image display technology has put to commercialization of stereoscopic image display devices. The related arts have been developed to mainly focus on obtaining and expressing stereoscopic images, but in order to promote an active commercialization of the stereoscopic image display devices, a standardized format is required to store and exchange contents. In addition, compatibility with existing techniques is also required.

DISCLOSURE

Technical Problem

An object of the present invention is to provide a media file format based on an ISO base media file, to effectively store and reproduce stereoscopic contents.

Another object of the present invention is to provide an apparatus for generating a media file based on an ISO base media file, and an apparatus for reproducing a media file based on an ISO base media file.

Technical Solution

To achieve the above objects, there is provided a media file format based on an ISO base media file includes: a first area including first information indicating whether or not a file includes stereoscopic contents; and a second area including second information related to a reproducing method or a storing method of a stream included in the stereoscopic contents.

To achieve the above objects, there is also provided a method for reproducing a media file based on an ISO base media file, including: determining whether or not an inputted media file includes stereoscopic contents; and decoding a stream included in the stereoscopic contents based on a reproducing method or a storing method of the stream, if the media file includes stereoscopic contents.

To achieve the above objects, there is also provided an apparatus for generating a media file based on an ISO base media file, including: a video encoder to encode an inputted video stream; a depth map encoder to encode an inputted depth map stream; an XML generating unit to generate an XML document including information regarding the depth map stream; and a media file forming unit to form a media file based on the encoded video stream, the encoded depth map bitstream, and the XML document.

To achieve the above objects, there is also provided an apparatus for reproducing a media file based on an ISO base media file, including: a media file parser to parse an inputted media file to extract an encoded video bitstream, an encoded depth map bitstream, and an XML document; a video decoder to decode the encoded video stream; a depth map decoder to decode the encoded depth map stream; and an XML parser to extract information regarding the depth map stream from the XML document.

Advantageous Effects

According to the present invention, items predefined in an ISO base media file format can be used without a correction to express and store stereoscopic contents. Thus, it can be applicable to new multimedia application format standards based on the ISO base media file format.

Meanwhile, in the present invention, because depth map data can be handled by using an ISO base media file format, existing resources can be re-used in implementing the media file reproducing apparatus for reproducing a stereoscopic image, and the media file reproducing apparatus can be compatible with existing devices.

DESCRIPTION OF DRAWINGS

FIG. 5 illustrates an XML schema in FIG. 4.

BEST MODE

Preferred embodiments of the present invention will now be described with reference to the accompanying drawings.

Figure 1:
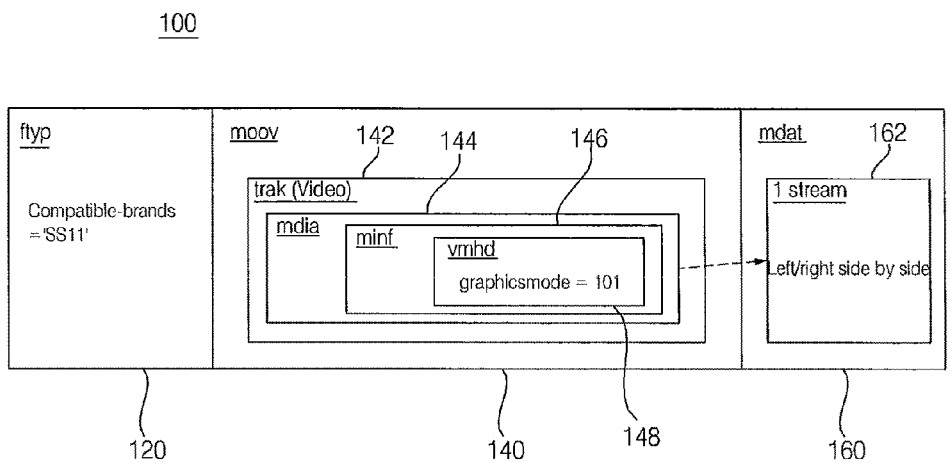
FIG. 1 illustrates a media file format based on an ISO base media file according to an embodiment of the present invention.

FIG. 1 illustrates a media file format based on an ISO base media file according to an embodiment of the present invention.

With reference to FIG. 1, a media file format in FIG. 1 includes a first area including first information indicating whether or not a file includes stereoscopic contents, and a second area including second information related to a reproducing method or a storing method of a stream of the stereoscopic contents. The media file format may further include a third area including a stream corresponding to the second information.

The first information may indicate a file for stereoscopic contents so as to be discriminated from an existing two-dimensional image. If the file includes stereoscopic contents, the second information may be information related to a reproducing method or a storing method of the stream in the stereoscopic contents. Here, the stream may be a video bitstream or a depth map bitstream in the stereoscopic contents. The depth map bitstream will be described later.

The first information may be information further indicating at least one of the number or version of streams provided in the stereoscopic contents. The second information related to the reproducing method and the storing method of streams of the stereoscopic contents may differ depending on the number or version of the streams included in the first information.

Preferably, the above-described media file format may be a media file format based on an ISO base media file format, a file format standard. Because the ISO base media file format, a standard format, is used as the media file format with respect to the stereoscopic contents, predefined items in the ISO base media file format can be used as it is, and thus, the media file format can be effectively defined. Regarding the stereoscopic contents, an item, which does not correspond to the ISO base media file format, may be defined separately.

In FIG. 1, the ISO base media file format 100 includes a file type box (ftyp) 120 corresponding to the first area, a movie box (moov) 140 corresponding to the second area, and a media data box (mdta) 160 corresponding to the third area.

Also, the first information is shown as 'compatible-brands' in the file type box (ftyp), and the second information is shown as 'graphicsmode' in the movie box (moov). Actually, the second information is positioned in a video media header box (vmhd) 148 of a media information box (minf) 144 of a media box (mdia) 144 of a video track box (trak) 142.

For example, in order to check whether or not a file includes stereoscope contents, 'SSxy' form is used on the 'compatible-brands'. Namely, if upper 2 bytes of 4-byte 'compatible-brands' start with 'SS', the file is determined to include stereoscope contents. If the upper 2 bytes do not start with 'SS', a corresponding file is determined to include 2D contents or stereoscope contents that have not been defined yet.

Numbers may be applied to xy of 'SSxy' of the 'compatible-brands' to discriminate it as a concrete form. 'x' may indicate the number of streams, and 'y' may indicate its version.

For example, if 'compatible-brands' is 'SS11', it indicates a version 1 of a one-stream type, and if 'compatible-brands' is 'SS21', it indicates a version 1 of a two-stream type.

Next, the 'graphicsmode' in the video media header (vmhd) box is used to display information regarding a reproducing method or a storing method of a stream provided in the stereoscopic contents. The 'graphicsmode' describes a 'composition mode' for a video track in the ISO base media file format, the file format standard.

For example, in a state of one stream ('SS11'), if the 'graphicsmode' is '101', it may indicate a 'left/right side by side' type 162 as a type for expressing it in one frame. If the 'graphicsmode' is '102', it may indicate an 'up/down side by side' type.

Besides the above-mentioned 'side by side' type, the one-stream type may further include a vertical cross type (left/right, up/down) by fields, time order cross type, or the like.

In a state of the two-stream ('SS21'), if the 'graphicsmode' is '200', it may indicate an 'original image'. If the 'graphicsmode' is '201', it may indicate a 'left image'. If the 'graphicsmode' is '202', it may indicate a 'right image', and if the 'graphicsmode' is '203', it may indicate a 'depth image'.

Besides the above-described types, the two-stream type may further include a type for separately storing left and right streams, a one stream+depth map stream type, or the like, and may also include a 3 or more stream type such as a left/right stream+depth map stream type.

FIG. 1 shows the case where the 'graphicsmode' is '101' which corresponds to the 'left/right side by side' type of one stream in the media data (mdat) box.

Meanwhile, besides the 'graphicsmode', 'opcolor' may be used as the second information.

Although not shown, the media file format 100 in FIG. 1 may further include a fourth area including camera information or display-associated information of stereoscopic contents. Here, the fourth area may be a meta data (metadata) box (not shown). In addition, as an embodiment, a schema in the form of an XML (eXtensible Markup Language) may be defined and stored.

The stereoscopic contents may include a video stream and a depth map stream corresponding to the video stream. Here, the video stream and the depth map stream may be stored in the third area, namely, in the media data (mdta) box.

Information regarding the depth map stream may be stored in the fourth area. Although the fourth area is not shown in the drawing, it may be a meta data (metadat) box (not shown).

In addition, the information regarding the depth map stream may include, as required map data, at least one of a position at which the depth map stream is stored, a position at which the video stream is stored, the number of bits of each pixel of a depth map, a scale value of information allocated to each pixel of the depth map, an offset of the depth map stream, and a start time and an end time at which the information regarding the depth map stream is applied. Its detailed description will be described hereafter.

An XML document including the information regarding the depth map stream may be stored in a fourth area by using an XML schema. Its detailed description will be described hereafter.

Figure 2:
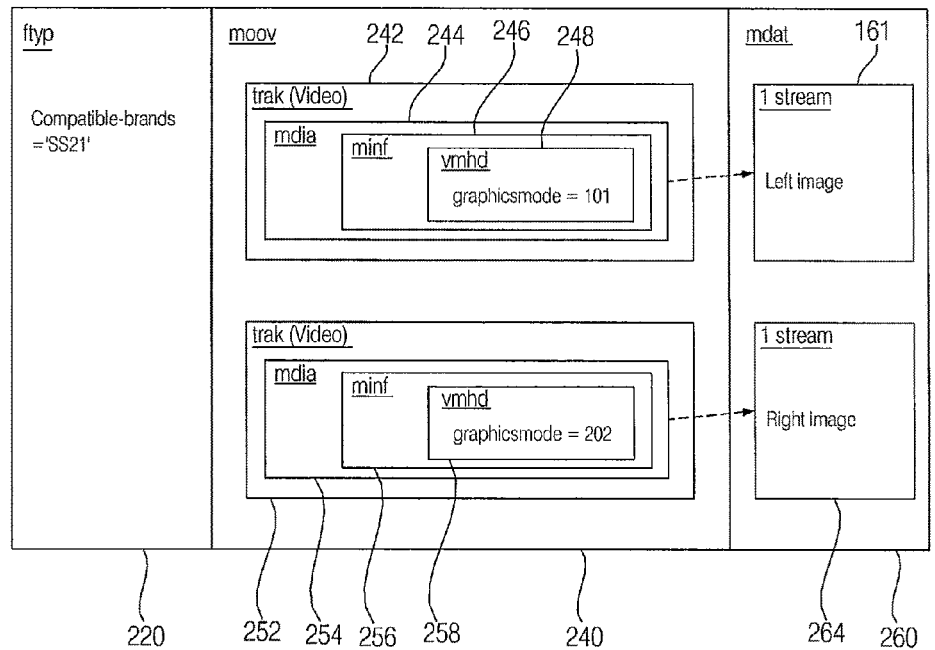
FIG. 2 illustrates a media file format based on an ISO base media file according to an embodiment of the present invention.

FIG. 2 illustrates a media file format based on an ISO base media file according to an embodiment of the present invention.

With reference to FIG. 2, a media file format 200 is the same as the media file format 100 in FIG. 1.

If the 'compatible-brands' is 'SS21', it indicates the presence of two streams in which the 'graphicsmode' of each stream is '201' and '202' whose 'left image' 161 and a 'right image' 264 correspond to the media data (mdat) box.

The description of FIG. 2 will be omitted with reference to FIG. 1.

Figure 3:
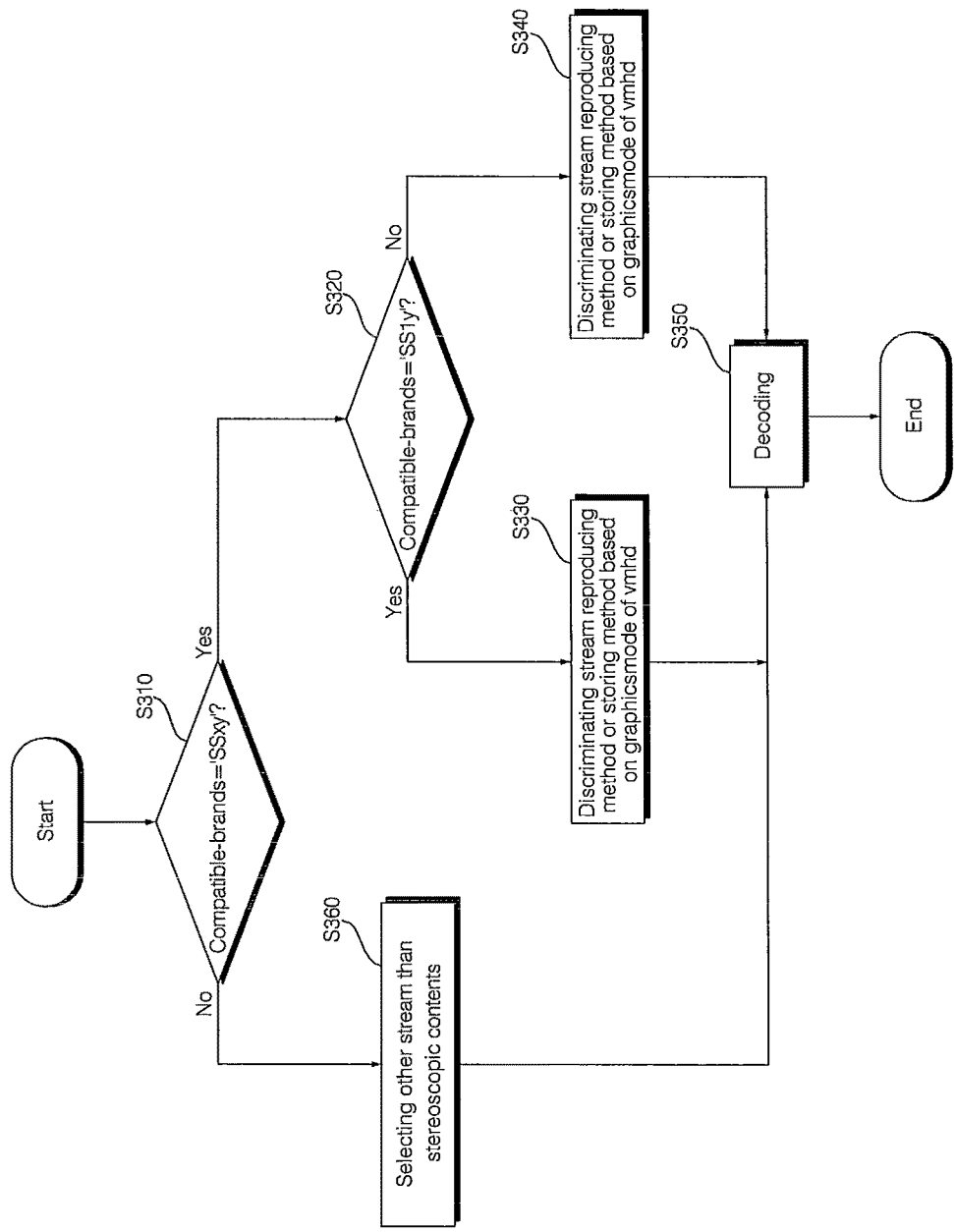
FIG. 3 is a flow chart illustrating the process of a method for reproducing a medial file based on an ISO base media file according to an embodiment of the present invention.

FIG. 3 is a flow chart illustrating the process of a method for reproducing a medial file based on an ISO base media file according to an embodiment of the present invention.

With reference to FIG. 3, according to the method for reproducing a media file based on an ISO base media file, first, it is determined whether or not an inputted media file includes stereoscopic contents. If the media file includes stereoscopic contents, a stream of the stereoscopic contents is decoded based on a reproducing method or a storing method of the stream. If the media file does not include stereoscopic contents, it may be decoded based on other video stream than stereoscopic contents.

In FIG. 3, in order to determine whether or not the inputted media file includes stereoscopic contents, first, it is determined whether or not the 'compatible-brands' is 'SSxy' (310). Here, the inputted media file may be a media file based on an ISO base media file as described above with reference to FIGS. 1 and 2.

If the 'compatible-brands' is 'SSxy', it is determined whether or not the 'compatible-brands' is 'SS1y' (S320). Namely, it is determined whether or not the stereoscopic contents have one stream (S320).

If the stereoscopic contents do not have one stream but, for example, two streams, a stream reproducing method or storing method is discriminated based on the 'graphicsmode' in the video media header (vmhd) box (S330). The stream reproducing method or storing method may be the same as shown in FIG. 2. In addition, various other methods may be used.

If the stereoscopic contents have one stream, a stream reproducing method or storing method is discriminated based on the 'graphicsmode' in the video media header (vmhd) box (S340). The stream reproducing method or storing method may be the same as shown in FIG. 1. In addition, various other methods may be used.

Meanwhile, if the 'compatible-brands' is not 'SSxy', other stream than stereoscopic contents is selected (S360).

Decoding is performed according to the reproducing method or storing method discriminated in step S330 or S340 or according to the stream selected in step S360 (S350). Besides the decoding, rendering may be additionally performed.

Figure 4:
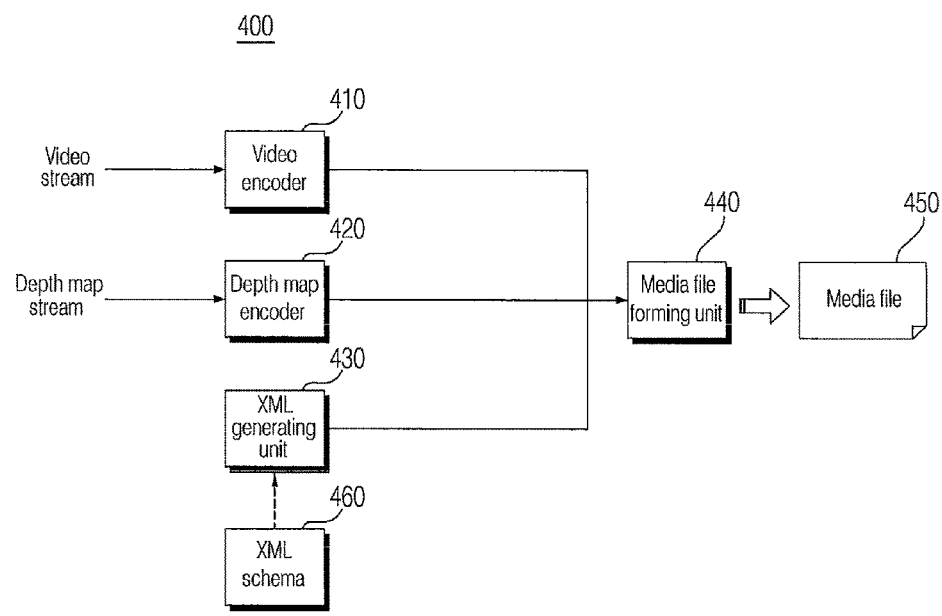
FIG. 4 is a schematic block diagram shown an apparatus for generating a media file based on an ISO base media file according to an embodiment of the present invention.
Figures 6, 7:
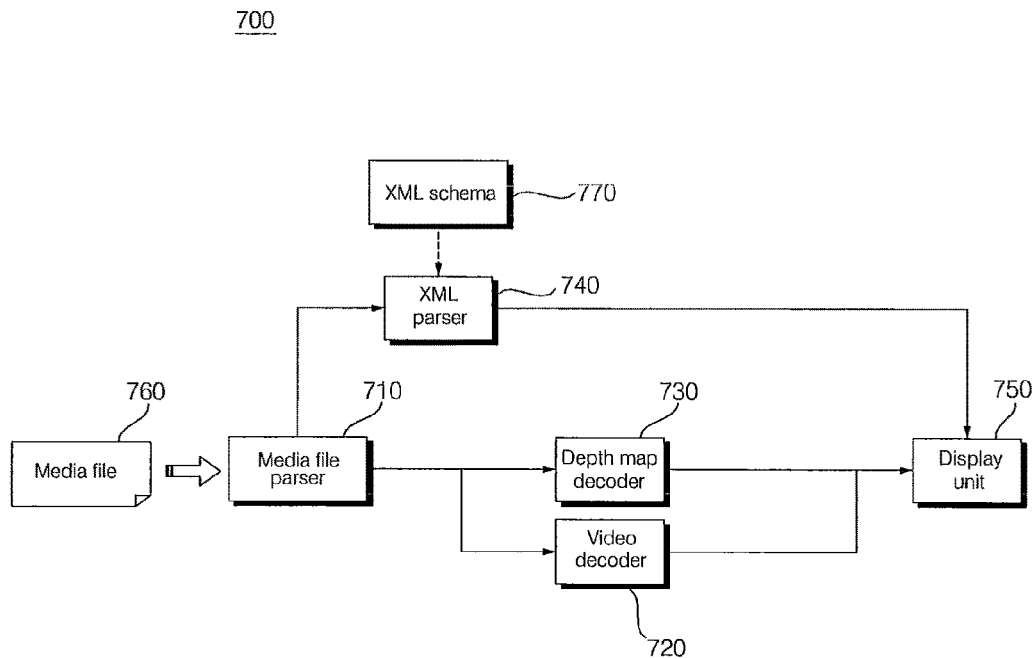
FIG. 6 illustrates an example of an XML document created according to the XML schema in FIG. 4.
FIG. 7 is a schematic block diagram showing an apparatus for reproducing a media file based on an ISO base media file according to an embodiment of the present invention.

FIG. 4 is a schematic block diagram shown an apparatus for generating a media file based on an ISO base media file according to an embodiment of the present invention, FIG. 5 illustrates an XML schema in FIG. 4, and FIG. 6 illustrates an example of an XML document created according to the XML schema in FIG. 4.

With reference to the drawings, an apparatus for generating a medial file based on an ISO base media file in FIG. 4 may include a video encoder 410, a depth map encoder 420, an XML generating unit 430, and a media file forming unit 440, and may further include an XML schema 460.

The video encoder 410 encodes an inputted video stream, and the depth map encoder 420 encodes an inputted depth map stream.

Here, the depth-map refers to information of a certain number of bits allocated to each pixel on a matrix with the same size as an original 2D image (video, still image, or the like) used for displaying a stereoscopic image. Each pixel value on the depth map indicates a relative distance in a lengthwise direction (perpendicular to a display) of corresponding pixels of the original 2D image.

The XML generating unit 430 generates an XML document including information regarding a depth map stream by using the XML schema 460. Here, the information regarding the depth map stream refers to required meta data that can be configured as follows:

depth-map id: An id of a track where the depth map stream is stored (position where the depth map stream is stored)

video track id: An id of a track where a stream of a 2D image corresponding to the depth map is stored (position where a video stream is stored)

The number of bits per pixel: The number of bits to be allocated to each pixel of the depth map Quantization level: A scale value applied to information allocated to each pixel of the depth map Offset in depth: An offset corresponding to the entire depth map, namely, a value corresponding to '0' of the depth map Start of time, end of time: A start time and an end time of an internal during which the arranged meta data are applied. In case of most videos, the same meta data is applied for a certain time period.

The quantization level value and the offset in depth value are proportional to the size of the width of a pixel of the original 2D data.

The depth map configured by the meta data has the size of (the number of bits per pixel) (image_x) (image_y), and each pixel on the depth map indicates a depth value (coordinates in a direction perpendicular to a display unit 750) of pixels of the corresponding original 2D image.

A conversion depth value using meta data has a value of (offset in depth)+2^(the number of bits per pixel) (quantization level) in the offset in depth. In this case, as for the depth value on the depth map, the width of a single pixel of the original 2D image is proportional to the length actually implemented on the display. In addition, a conversion depth value 0 of the depth map refers to a planar surface of an image display unit of a display unit (750 in FIG. 7).

By storing the stream of the defined depth map as a track of an ISO base media file format and providing the above-described required meta data, multimedia data aimed to effectively display a stereoscopic image can be stored in the ISO base media file format.

FIG. 5 shows an example for storing the above-described required meta data in the ISO base media file format, and the required meta data in the XML schema 460 corresponds as follows:

depth-map id: ID
video track id: VideoTrackID
number of bits per pixel: BitNum
quantization level: QuantLevel
offset in depth: Offset
start of time: StartTime
end of time: EndTime FIG. 6 shows an example of an XML document created according to the XML schema 460 as shown in FIG. 4. FIG. 6 shows storing of the depth map and the meta data in the ISO base media file format by using the XML schema 460.

The video stream and the depth map stream are encoded and stored in each track. The XML document created according to the XML schema 460 is stored in a meta data box (not shown) of the ISO base media file format.

The media file forming unit 440 combines the video stream encoded by the video encoder 410, the depth map stream encoded by the depth map encoder 420, and the XML document generated by the XML generating unit 430 to form a media file 450 based on the ISO base media file format.

FIG. 7 is a schematic block diagram showing an apparatus for reproducing a media file based on an ISO base media file according to an embodiment of the present invention.

With reference to FIG. 7, the apparatus for reproducing a media file based on the ISO base media file according to an embodiment of the present invention includes a media file parser 710, a video decoder 720, a depth map decoder 730, an XML parser 740, and a display unit 750, and may further include an XML schema 770.

The media file parser 710 parses an inputted media file 760 based on the ISO base media file format to extract an encoded video bitstream, an encoded depth map bitstream, and an XML document.

The video decoder 720 decodes the extracted encoded video stream, and the depth map decoder 730 decodes the extracted encoded depth map stream.

The XML parser 740 extracts information regarding a depth map stream from the XML document. Namely, the XML parser 740 parses the XML document by using the XML schema 770. Meanwhile, the information regarding the depth map stream is the same as the above-described required meta data.

the display unit 750 displays a stereoscopic image by using the decoded video stream, the depth map stream and the information regarding the map stream based on the ISO base media file format.

Namely, an ID of a video track and that of a depth map track are recognized through the media file parser 710, decoding is separately performed to obtain the original video stream and the original depth map stream, and processing is performed with reference to the required meta data stored in the XML, thereby obtaining the stereoscopic image.

Meanwhile, in case of the existing media file reproducing apparatus that does not support a stereoscopic image, it can reproduce only the video track of the ISO base media file format generated according to the present invention, thus reproducing 2D video without any problem.

The method for reproducing a media file based on an ISO base media file according to the present invention can be implemented as codes that can be read by a processor provided in the media file reproducing apparatus in a recording medium that can be read by the processor. The processor-readable recording medium includes various types of recording devices in which data that can be read by the processor is stored. The processor-readable recording medium may include a ROM, a RAM, a CD-ROM, a magnetic tape, a floppy disk, an optical data storage device, and the like. The processor-readable recording medium also includes implementations in the form of carrier waves such as transmission via the Internet. The processor-readable recording medium is distributed to a computer system connected to a network, in which codes that can be read by the processor in a distributed manner can be stored and executed.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

INDUSTRIAL APPLICABILITY

The media file format based on the ISO base media file, the method and apparatus for reproducing the same, and an apparatus for generating the same can be used to effectively process stereoscopic contents.

The invention claimed is:

1. A method for reproducing a media file based on an ISO base media file, the method comprising:
   determining whether or not an inputted media file includes identifiable stereoscopic contents based on first information indicating type of stereoscopic contents;
   when the inputted media file includes the identifiable stereoscope contents, determining the number of streams provided in the stereoscopic contents;
   when the stereoscopic contents includes two streams, decoding the two streams in the stereoscopic contents based on a first media file including the two streams, and
   when the stereoscopic contents includes one stream, decoding the stream in the stereoscopic contents based on a second media file including the one stream,
   wherein the first media file includes a file type box including the first information indicating the type of stereoscopic contents, a movie box including a first video track box corresponding to a first stream of the stereoscopic contents and a second video track box corresponding to a second stream of the stereoscopic contents, and a media data box including the first stream and the second stream,
   wherein the first and second video track boxes include a media box, respectively, each media box of the first and second video track boxes includes a media information box, and each media information box of the first and second video track boxes includes second information indicating the composition type of the stereoscopic contents,
   wherein the first media file further includes a meta box including camera information or display-associated information of the stereoscopic contents, and the meta box further includes an XML (eXtensible Markup Language) document, which includes information of depth-map identification, video track identification, the number of bits per pixel of the depth map, quantization level, offset in depth, start of time, and end of time regarding the depth map stream, and
   wherein the quantization level value and the offset in depth value are proportional to a length of a display.

2. The method of claim 1, wherein the second media file includes a file type box including information indicating the type of stereoscopic contents, a movie box including a video track box corresponding to the one stream of the stereoscopic contents, and a media data box including video stream, and
   wherein the video track box includes a media box, the media box of the video track box includes a media information box, and the media information box of the video track box includes information indicating the composition type of the stereoscopic contents.

3. The method of claim 1, further comprising:
   when the inputted media file does not include the identifiable stereoscope contents, selecting other stream than stereoscopic contents and decoding the other stream.

4. The method of claim 1, wherein the first stream includes a 2D video stream and the second stream includes a depth map stream.

5. An apparatus for reproducing a media file based on an ISO base media file, comprising:
   a media file parser to parse an inputted media file, to determine whether or not the inputted media file includes identifiable stereoscope contents based on first information indicating type of stereoscopic contents, and when the inputted media file includes the identifiable stereoscope contents, to determine the number of streams provided in the stereoscopic contents;
   a video decoder to, when the stereoscopic contents includes two streams, decode the two streams in the stereoscopic contents based on a first media file including the two streams, and, when the stereoscopic contents includes one stream, decode the stream in the stereoscopic contents based on a second media file including the one stream; and
   a display unit to display a stereoscopic image based on the decoded stream,
   wherein the first media file includes a file type box including the first information indicating the type of stereoscopic contents, a movie box including a first video track box corresponding to a first stream of the stereoscopic contents and a second video track box corresponding to a second stream of the stereoscopic contents, and a media data box including the first stream and the second stream,
   wherein the first and second video track boxes include a media box, respectively, each media box of the first and second video track boxes includes a media information box, and each media information box of the first and second video track boxes includes second information indicating the composition type of the stereoscopic contents,
   wherein the first media file further includes a meta box including camera information or display-associated information of the stereoscopic contents, and the meta box further includes an XML (eXtensible Markup Language) document, which includes information of depth-map identification, video track identification, the number of bits per pixel of the depth map, quantization level, offset in depth, start of time, and end of time regarding the depth map stream, and wherein the quantization level value and the offset in depth value are proportional to a length of a display.

6. The apparatus of claim 5, wherein the second media file includes a file type box including information indicating the type of stereoscopic contents, a movie box including a video track box corresponding to the one stream of the stereoscopic contents, and a media data box including video stream, and wherein the video track box includes a media box, the media box of the video track box includes a media information box, and the media information box of the video track box includes information indicating the composition type of the stereoscopic contents.

7. The apparatus of claim 5, wherein the first stream includes a 2D video stream and the second stream includes a depth map stream.

8. The apparatus of claim 5, further comprising:
a depth map decoder to decode encoded depth map stream; and
an XML parser to extract information regarding the depth map stream from the XML document.

9. An apparatus for generating a media file based on an ISO base media file, comprising:
a video encoder to encode an inputted video stream; and
a media file forming unit to form a first media file or a second media file based on the encoded video stream,
wherein the first media file includes a file type box including first information indicating the type of stereoscopic contents, a movie box including a first video track box corresponding to a first stream of the stereoscopic contents and a second video track box corresponding to a second stream of the stereoscopic contents, and a media data box including the first stream and the second stream,
wherein the first and second video track boxes include a media box, respectively, each media box of the first and second video track boxes includes a media information box, and each media information box of the first and second video track boxes includes second information indicating the composition type of the stereoscopic contents,
wherein the first information includes information indicating whether or not the inputted media file includes identifiable stereoscope contents based on first information indicating type of stereoscopic contents, and information indicating the number of streams provided in the stereoscopic contents,
wherein the first media file further includes a meta box including camera information or display-associated information of the stereoscopic contents, and the meta box further includes an XML (eXtensible Markup Language) document, which includes information of depth-map identification, video track identification, the number of bits per pixel of the depth map, quantization level, offset in depth, start of time, and end of time regarding the depth map stream, and
wherein the quantization level value and the offset in depth value are proportional to a length of a display.

10. The apparatus of claim 9, wherein the second media file includes a file type box including information indicating the type of stereoscopic contents, a movie box including a video track box corresponding to the one stream of the stereoscopic contents, and a media data box including video stream, and
wherein the video track box includes a media box, the media box of the video track box includes a media information box, and the media information box of the video track box includes information indicating the composition type of the stereoscopic contents.

11. The apparatus of claim 9, wherein the first stream includes a 2D video stream and the second stream includes a depth map stream.

12. The apparatus of claim 9, further comprising:
a depth map encoder to encode an inputted depth map stream; and
an XML generating unit to generate an XML document including information regarding the depth map stream.

* * * * *